(12) United States Patent
Story et al.

(10) Patent No.: US 11,852,151 B2
(45) Date of Patent: *Dec. 26, 2023

(54) FAN ARRAY WIRING SYSTEM (71) Applicant: Q-PAC Systems Inc., Elkton, FL (US)

(72) Inventors: Robert Clarke Story, St. Johns, FL (US); Matthew Wayne Kent, St. Augustine, FL (US); David Kurt Thomas, Palm Coast, FL (US)

(73) Assignee: Q-PAC SYSTEMS, INC., Elkton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,939

(22) Filed: Jul. 1, 2022

(65) Prior Publication Data

US 2022/0333605 A1 Oct. 20, 2022

Related U.S. Application Data

(63) Continuation of application No. 16/003,556, filed on Jun. 8, 2018, now Pat. No. 11,378,085.

(60) Provisional application No. 62/516,862, filed on Jun. 8, 2017.

(51) Int. Cl.
*H02G 3/08* (2006.01)
*F04D 25/06* (2006.01)
*F04D 27/00* (2006.01)
*F04D 25/16* (2006.01)

(52) U.S. Cl.
CPC ....... *F04D 25/0693* (2013.01); *F04D 25/166* (2013.01); *F04D 27/004* (2013.01); *H02G 3/08* (2013.01)

(58) Field of Classification Search
CPC ............ H02G 3/08; H02G 3/081; H02G 5/10; H05K 5/00; H05K 5/02; H05K 7/20172; H05K 7/20136; H05K 7/20; F04D 25/0693; F04D 25/166; F04D 27/004; F04D 25/08
USPC ........................ 174/50, 540, 520, 535, 17 R; 220/3.2–3.9, 4.02; 361/600, 601, 677, 361/679.01, 679.46, 679.48, 679.02
See application file for complete search history.

(56) References Cited

U.S. PATENT DOCUMENTS

| | | |
|---|---|---|
| 4,806,833 A | 2/1989 | Young |
| 6,496,366 B1 | 12/2002 | Coglitore et al. |
| 7,508,663 B2 | 3/2009 | Coglitore |

(Continued)

*Primary Examiner* — Angel R Estrada
(74) *Attorney, Agent, or Firm* — Marks Gray, P.A.; Mitchell Ghaneie; Christopher Roberts (57) ABSTRACT

The present invention is an HVAC fan array wiring system that provides a quick connect box that is provided within the air stream of an HVAC air handler. Because the wiring for each fan within the fan array is to be connected to the quick connect box, the wiring materials and placement of the wiring can be predetermined at the time the fan array is designed. Accordingly, the novel wiring system and quick connect box reduces redundancies in manufacturing and installation of the fan array. Furthermore, the quick connect box and wiring system allows for easy installation of the HVAC fan array at a job site and improves a customer's experience with the control panel. This is primarily because, with the use of the claimed invention, an electrician need only link a main control and power line to the quick connect box and therefore, can install the control panel in a location that provides ease of access to the customer.

45 Claims, 10 Drawing Sheets

(56) References Cited

U.S. PATENT DOCUMENTS

| | | |
|---|---|---|
| 8,031,467 B2 | 10/2011 | Cheng et al. |
| 8,767,400 B2 | 7/2014 | Dickinson et al. |
| 8,939,722 B2 | 1/2015 | Liu et al. |
| 9,459,015 B2 | 10/2016 | Karamanos et al. |
| 9,491,889 B2 | 11/2016 | Li |
| 10,231,361 B2 | 3/2019 | Chen et al. |
| 10,897,839 B2 | 1/2021 | Bernardin et al. |
| 11,378,085 B2 * | 7/2022 | Story .................... F04D 25/166 |
| 2010/0070089 A1 | 3/2010 | Harrod et al. |

* cited by examiner

FAN ARRAY WIRING SYSTEM

RELATED APPLICATIONS

The present nonprovisional patent application is a continuation of U.S. patent application Ser. No. 16/003,556, filed on Jun. 8, 2018, which claims the benefit of the filing date under 35 U.S.C. § 119(e) of Provisional Patent Application Ser. No. 62/516,862 filed on Jun. 8, 2017, each of which is hereby incorporated by reference in its entirety.

BACKGROUND OF THE INVENTION

A. Field of the Invention

This invention is related to a fan array wiring system that uses a quick connect box, which is installed in a predetermined location proximate to the fan array. The quick connect box may be installed in the airstream of an air handling unit or outside the airstream of an air handling unit. While this invention is described with using arrays of electronically commutated motor (ECM) fans, it can be utilized with other electric fans.

B. Prior Art

Traditionally, fan arrays have been comprised of AC motor fans that are stacked, supported by structure, or fixed into racks. However, while ECM fans have gained popularity in the HVAC industry for various reasons, there is a significant drawback. ECM fan arrays require a relatively more complex wiring system when compared to that of an AC motor fan array. This creates significant issues when a custom air handling unit with an ECM fan array is delivered to a job site because a typical electrician is not familiar with installing the wiring system for the ECM fans.

The prior art requires that the motor cover of each fan be opened and wiring be provided from each fan to a control panel, which is installed on the outside of the air handling unit. This is significantly different from how an AC motor fan is wired and installed by an electrician. The electrical installation of ECM fans can be complicated for an electrician who has never installed an array of ECM fans. Because electricians are not usually trained to install this type of fan, they often have many questions or may refuse to make the installation all together. Consequently, logistical issues arise because each state has its own code for electrical installations, about which, the sales representative of the fan array is not knowledgeable.

Furthermore, in the prior art it is taught that the wiring from each fan within the fan array must be individually connected directly to the control panel. Thus, due to the complexity and expense of linking the fan array to the control panel, the control panel is typically placed on the exterior of the HVAC unit housing the ECM fan array.

However, the present invention aims to resolve this drawback by providing a quick connect box proximate to the fan array system for an electrician to link to from the control panel, thereby streamlining the installation process of the unit by limiting redundancies. Additionally, the end user can place the control panel to the HVAC unit in a convenient and accessible location.

BRIEF SUMMARY OF THE INVENTION

This invention is a power and control wiring system for a fan array that provides a quick connect box and a plurality of wires which are connected between the quick connect box and each fan of the fan array. The quick connect box can be placed within the airstream of the air handling unit or outside of the air handling unit as long as it is proximate to the fan array. While the quick connect box is shown and described as being attached to the bulkhead in the airstream, it can be placed on the exterior side of the air handling unit. A main power line and main control line extends from the quick connect box to a control panel. The control panel can then be placed in an easily accessible area for maintenance purposes as the customer desires.

By providing a quick connect box proximate to a fan array of an air handling unit, it allows for an ECM fan array and the wiring for each fan within the array to be pre-determined and pre-engineered for optimal efficiency of manufacturing time, installation time, and expense of materials. Accordingly, when the fan array system is being installed at the desired location or job site, an electrician can then provide the ECM fan array with a power and control link connection between the control panel and the quick connect box. Furthermore, the control panel can be placed in a convenient location for the end user or customer. In turn, the present invention assists in streamlining installation of the fan array system and improves accessibility for maintenance.

NUMBERING REFERENCE

5—Fan Array Wiring System
10—Bulkhead of fan array
12—ECM fan
15—Sidewall of air handling unit
20—Plurality of wire
25—Quick connect box
30—Main power line
35—Main control line
40—Control panel
50—Exterior wall

DETAILED DESCRIPTION OF THE INVENTION

The present invention is an HVAC fan array power and control wiring system 5 that is described below in detail. The fan array power and control system is comprised of a quick connect box 25 and a plurality of power and control wires 20. The plurality of wires connect the quick connect box 25 to a plurality of ECM fans 12. Although this invention is described as being used in connection with ECM fans 12, it is anticipated that alternative fans may also be utilized with the fan array wiring systems described herein. The quick connect box 25 is comprised of terminal blocks, busbars, a power distribution block, a plurality of plug connectors, and branch circuit protection. Alternatively, the quick connect box may be further comprised of a pressure transmitter, a plurality of pressure ports, control relays, a plurality of status lights, a contactor, a disconnect switch, or any combination thereof.

The quick connect box 25 should be placed in a location that is proximate to the fan array, either internally within the air stream of an air handling unit or on the exterior of the air handling unit. It is also anticipated that a plurality of air hoses (not shown) can be provided between each fan of the fan array 12 and to a plurality of pressure ports within the quick connect box 25.

It is preferred that the location of the quick connect box 25 is predetermined prior to installation and attached to the bulkhead in the air stream. The quick connect box 25 may also be attached to a sidewall 15 of the unit or other location within the air stream of the air handling unit, which is not shown in the figures. The quick connect box 25 could also be placed on the exterior of the air handling unit. However, in any location the quick connect box 25 should be proximate to the fan array.

Figure 1:
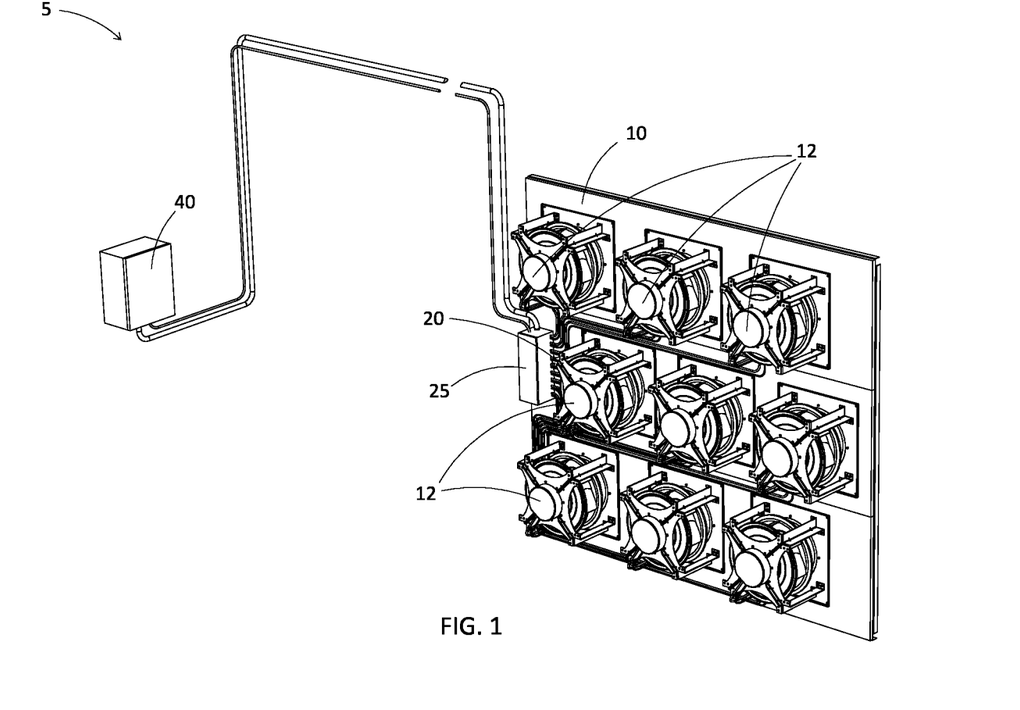
FIG. 1 is a top isometric view of the fan array wiring system, which shows a quick connect box attached to the bulkhead of an air handling unit and is wired to nine ECM fans as well as a control panel.
Figure 2:
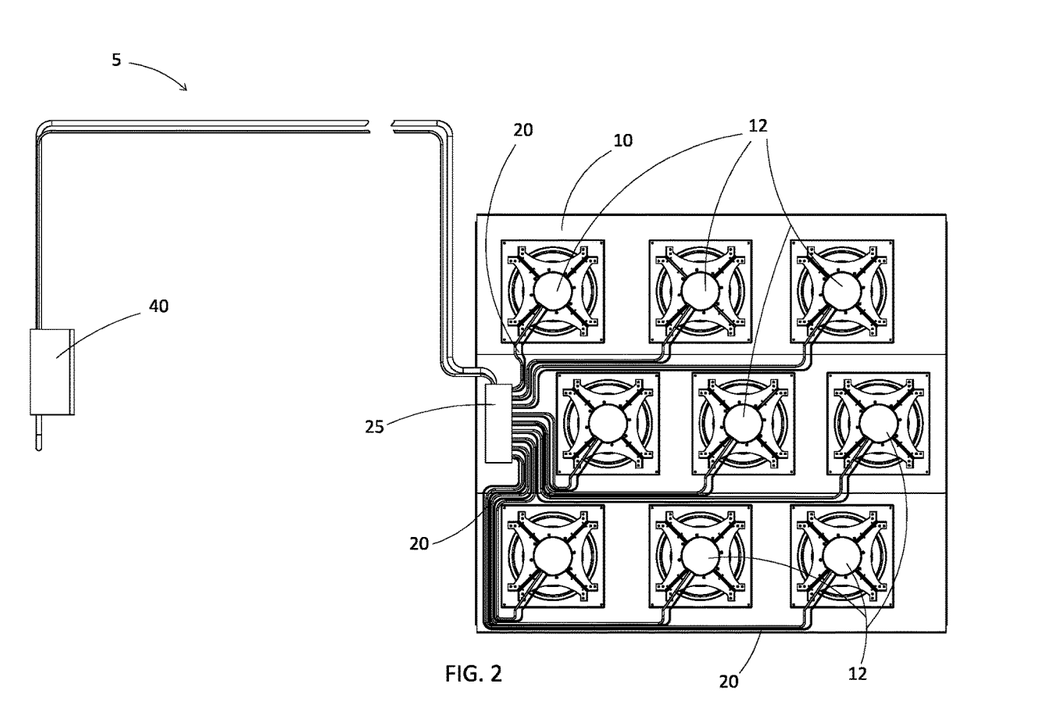
FIG. 2 is a front view of the fan array wiring system, which shows a quick connect box attached to the bulkhead of an air handling unit and is wired to nine ECM fans and a control panel.

There is typically a control wire and a power wire that must be hooked to each fan 12. The plurality of wires 20 are best shown in FIG. 2. The length and placement of each wire 20 as well as the placement of the quick connect box 25, is predetermined based on the placement of each fan 12. By predetermining the location of the quick connect box 25 relative to the plurality of fans 12 removes redundancies. Thus, assembly of the fan array power and control system in the field can be substantially faster because an electrician need only link the control panel 40 to the quick connect box 25.

For example, instead of extending wire from each fan through the sidewall 15 of the air handling unit and then to the control panel 40, the electrician will only need to link the control panel 40 to the quick connect box 25 with a control and power line. This is because the quick connect box 25 and the plurality of wires 20 can be pre-engineered and then installed with the fan array prior to being shipped to the customer's location.

Each wire within the plurality of wires 20 for the array of ECM fans 12 has a first end and a second end. The first end of each wire within the plurality of wires 20 is connected to an ECM fan of the fan array 12. The second end of each wire within the plurality of wires 20 is brought into the quick connect box 25. Quick connect power and control plug connectors may also be provided on the quick connect box 25. The quick connect power and control plug connectors are used for connecting the quick connect box 25 to the second end of each wire within the plurality of wires 20.

Once the second end of each wire of the plurality of wires 20 is placed within or otherwise connected to the quick connect box 25, the plurality of wires 20 are bussed together into a main power line 30 and a main control line 35 within the quick connect box 25. It is anticipated that the plurality of wires 20 may be bussed or spliced together into a single power and control line.

This allows a third party to link a control panel 40 to the quick connect box 25 by merely linking the panel 40 into the quick connect box 25. This is substantially more efficient than requiring an electrician to run the wires individually from each fan through the sidewall 15 of the air handling unit and into an external panel 40.

In addition to the plurality of wires 20, a plurality of air hoses (not shown) can also be placed between each of the plurality of fans 12 and the quick connect box 25. The quick connect box 25 can provide a pressure transmitter that each of the plurality of air hoses connect to. Like the plurality of wires 20, the length and placement of the air hoses may also be predetermined. For convenience, it is anticipated that a plurality of ports can be provided on the quick connect box 25 to accept the plurality of air hoses. The pressure transmitter then transmits the pressure within the air stream to the control panel 40, once the control panel is linked to the quick connect box 25.

The disconnect switch and circuit branch protection provided within the quick connect box 25. The circuit branch protection is utilized to prevent electrical damage to the fans within the fan array 12 and the building's electrical system. If a fan within the fan array 12 has a critical failure, or if a electrical wire draws an excessive amount of power, the branch circuit protection device will interrupt the connection to the malfunctioning electrical branch.

By installing the various components, which are shown in FIG. 5, FIG. 6, FIG. 7, FIG. 8, FIG. 9, and FIG. 10, in the quick connect box 25 and the plurality of wires that connect the fan array 12 to the quick connect box 25, the necessary electrical components can be installed where the HVAC fan array 12 is designed and manufactured. Accordingly, the HVAC fan array wiring system and fan array can be tested prior to delivery.

Figure 3:
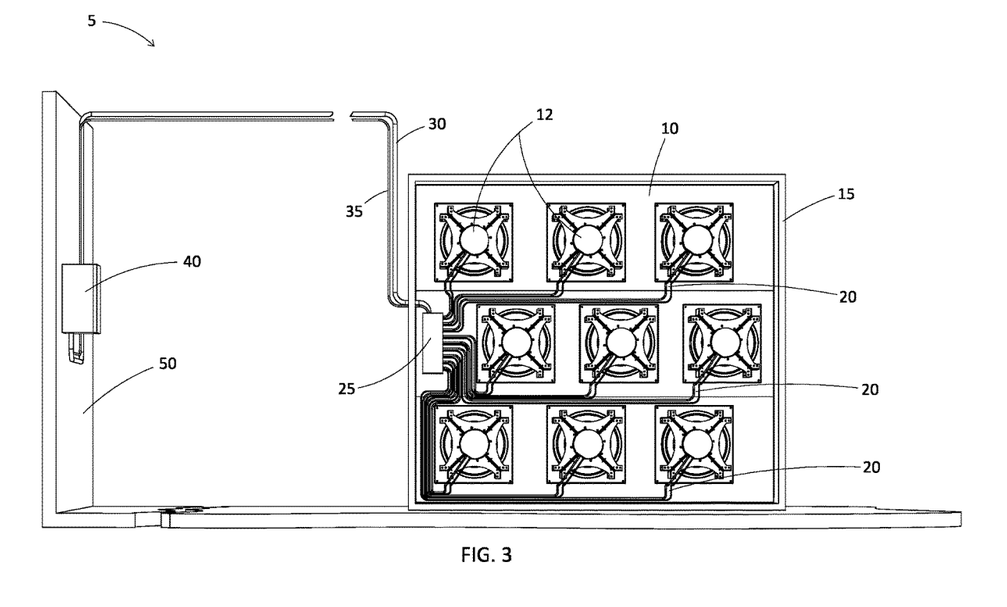
FIG. 3 is a front in use view of the fan array wiring system which shows the quick connect box attached to the bulkhead of an air handling unit. This figure additionally shows the quick connect box wired to nine ECM fans and an external box. The quick connect box is also wired to an external box with power and control wires, which extend through the sidewall of the air handling unit and connects to a control panel. The control panel is attached to a wall outside the air handler.
Figure 4:
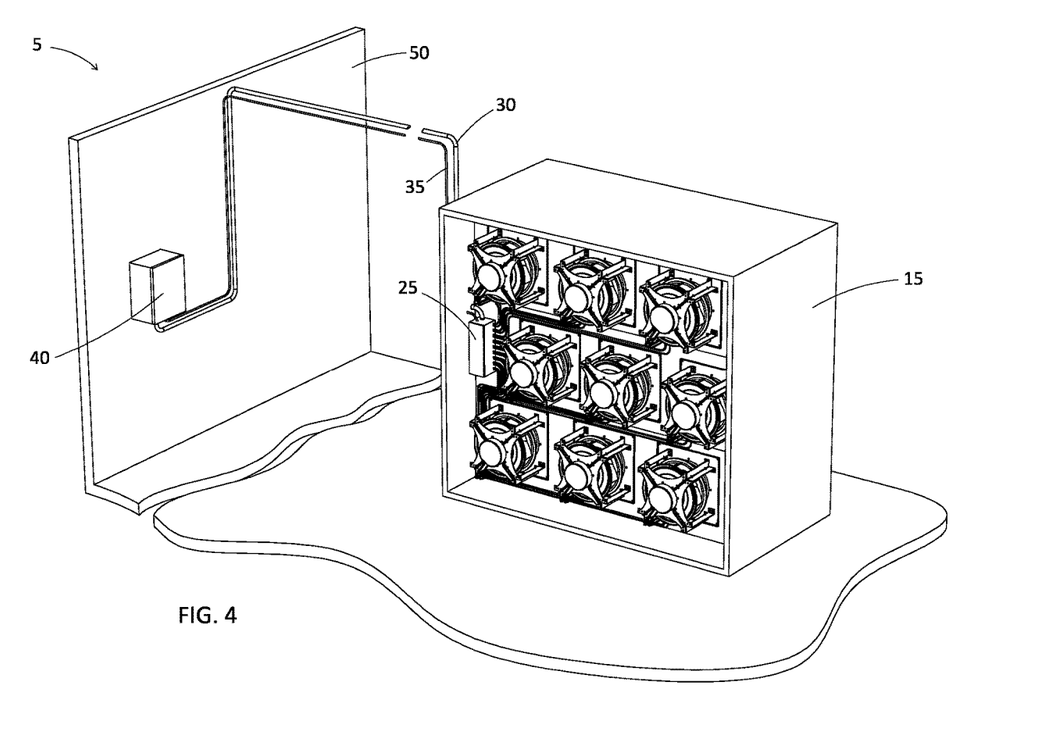
FIG. 4 is a top isometric in use view of the fan array wiring system which shows the quick connect box attached to the bulkhead of an air handling unit. In addition, this figure shows the quick connect box wired to nine ECM fans and a control panel. The quick connect box is also wired to a control panel with main power and control lines, which extend through the sidewall of the air handling unit and connect to the control panel. The control panel is attached to a wall outside the air handler.
Figure 5:
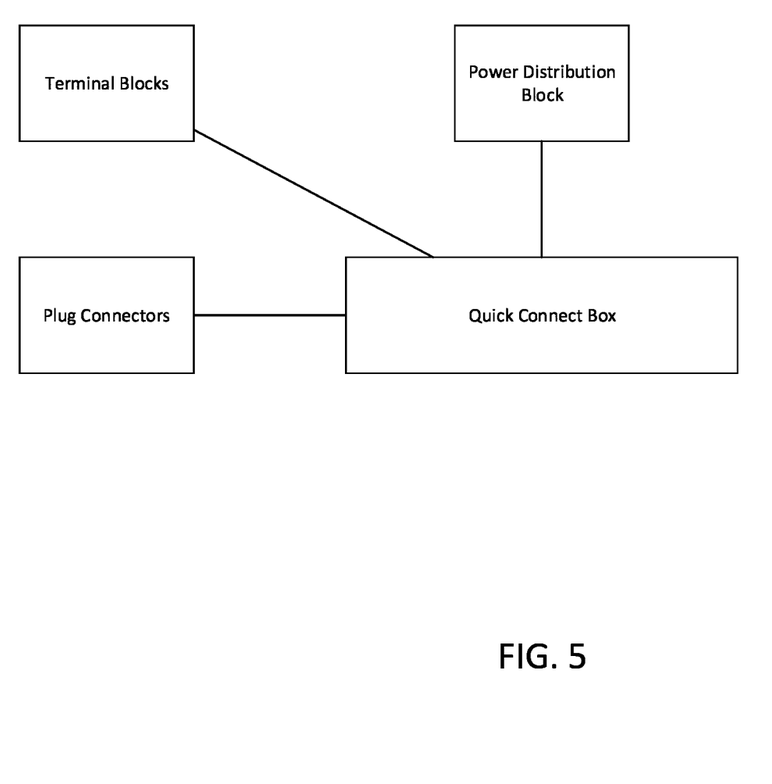
FIG. 5 is a diagram showing components of a quick connect box, which is comprised of a plurality of plug connectors, a plurality of terminal blocks, and a power distribution block.
Figure 6:
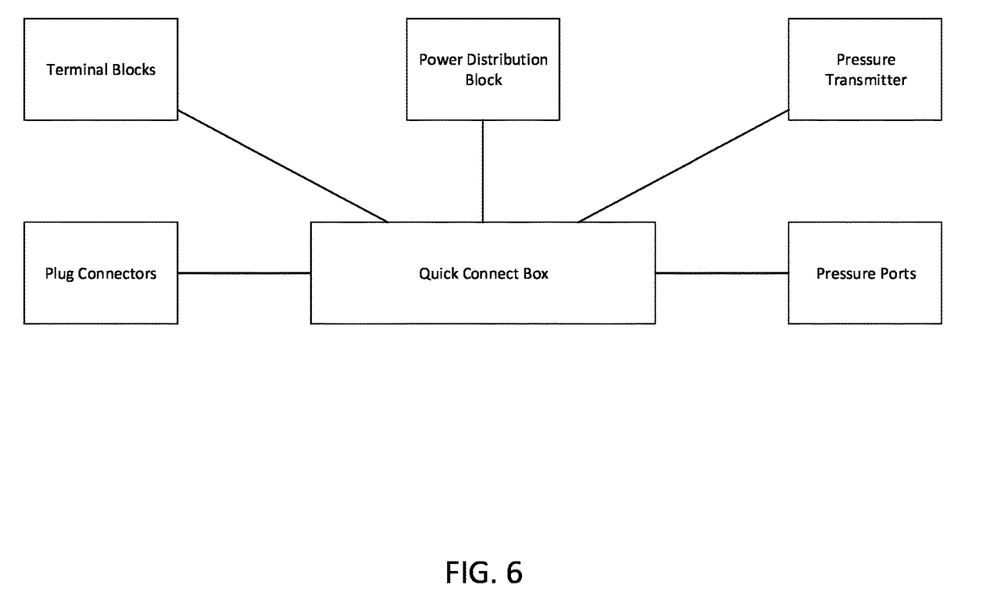
FIG. 6 is a diagram showing components of a quick connect box, which is comprised of a plurality of plug connectors, a plurality of terminal blocks, a power distribution block, a pressure transmitter, and a plurality of pressure ports.
Figure 7:
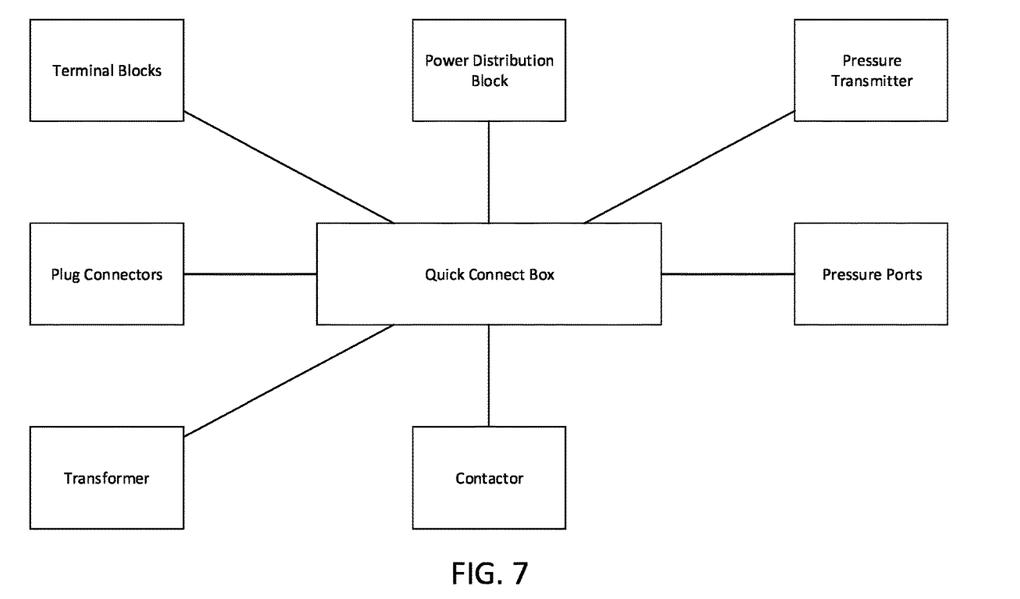
FIG. 7 is a diagram showing components of a quick connect box, which is comprised of a plurality of plug connectors, a plurality of terminal blocks, a power distribution block, a pressure transmitter, a plurality of pressure ports, and a contactor.
Figure 8:
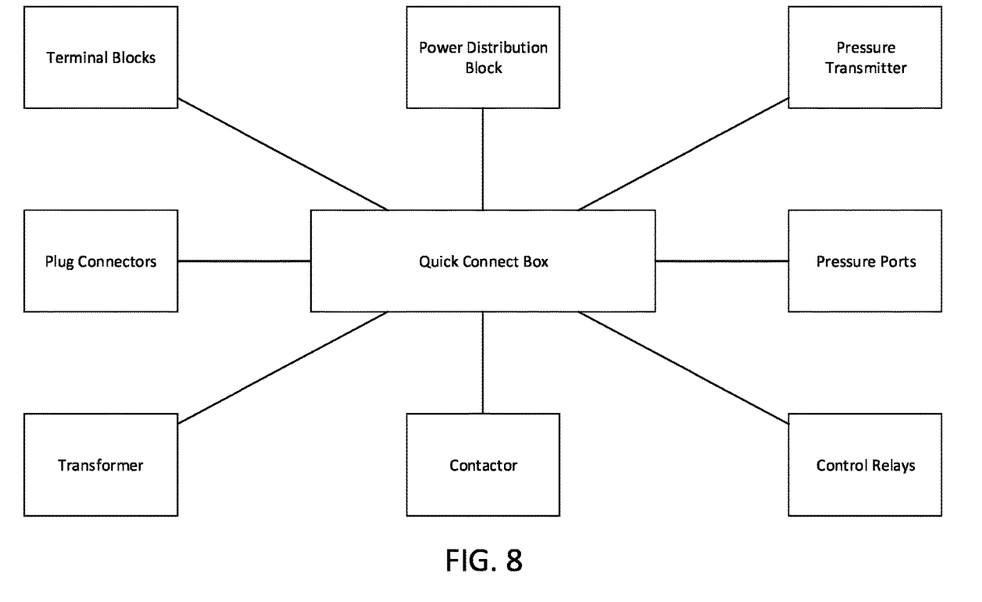
FIG. 8 is a diagram showing components of a quick connect box, which is comprised of a plurality of plug connectors, a plurality of terminal blocks, a power distribution block, a pressure transmitter, a plurality of pressure ports, a plurality of control relays, a contactor, and a transformer.
Figure 9:
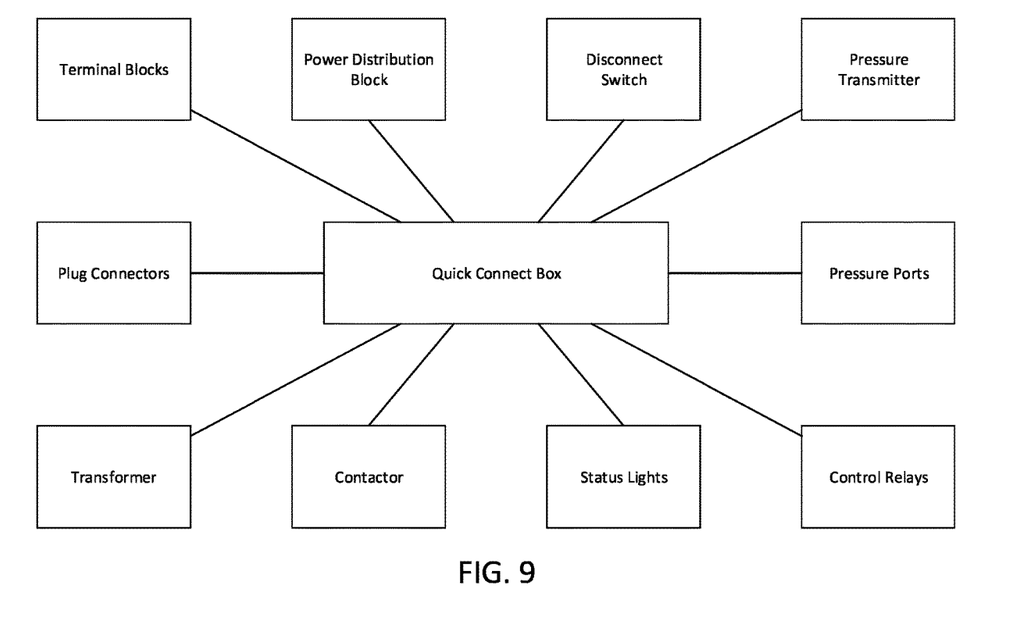
FIG. 9 is a diagram showing components of a quick connect box, which is comprised of a plurality of plug connectors, a plurality of terminal blocks, a power distribution block, a disconnect switch, a pressure transmitter, a plurality of pressure ports, a plurality of control relays, a plurality of status lights, a contactor, and a transformer.
Figure 10:
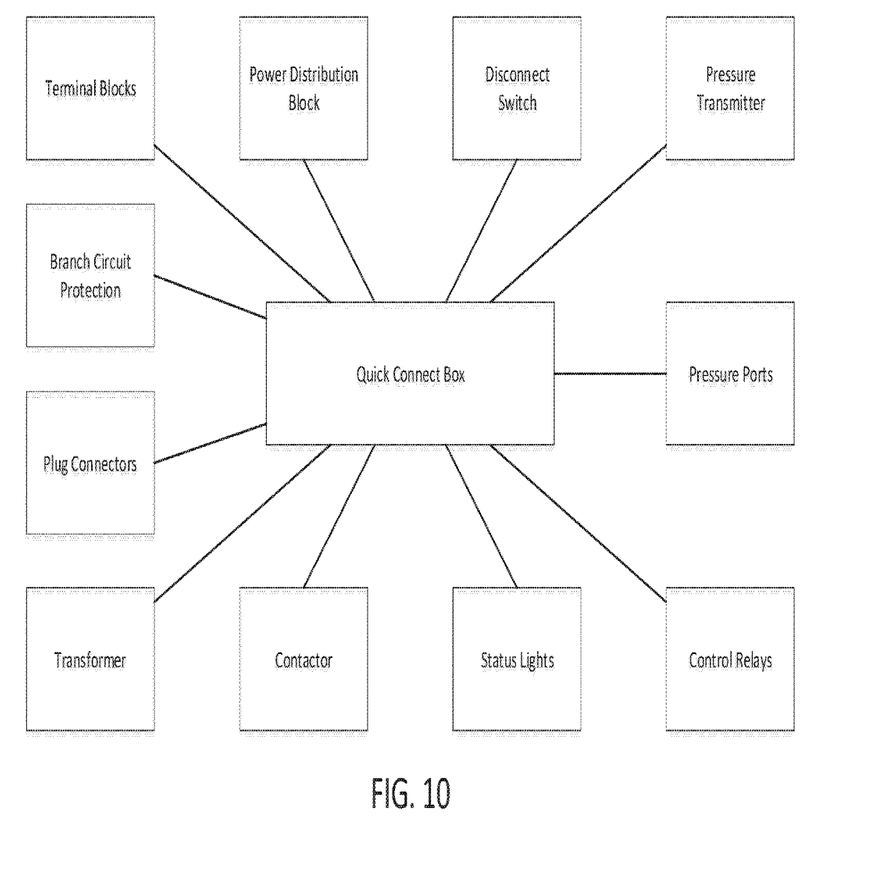
FIG. 10 is a diagram showing components of a quick connect box, which is comprised of a plurality of plug connectors, a plurality of terminal blocks, a power distribution block, a disconnect switch, a pressure transmitter, a plurality of pressure ports, a plurality of control relays, a plurality of status lights, a contactor, a transformer, and branch circuit protection.

Furthermore, the present invention only requires one or two holes to be made in the sidewall 15 of the air handling unit, which is shown in FIG. 3 and FIG. 4. This fan array wiring system 5, allows for more efficient use of materials, minimizes redundancy, and provides for easier installations by an electrician in the field.

While the embodiments of the invention have been disclosed, certain modifications may be made by those skilled in the art to modify the invention without departing from the spirit of the invention.

The inventor claims:

1. An HVAC fan array wiring system which is comprised of:
   a. a quick connect box;
      wherein the quick connect box is comprised of:
         i. a plurality of terminal blocks;
         ii. a plurality of plug connectors;
         iii. a power distribution block;
         iv. branch circuit protection;
      wherein the quick connect box is mounted to a bulkhead of an air handling unit;
   b. a plurality of wires;
      wherein each wire within the plurality of wires has a first end and a second end;
      wherein the first end of each wire within the plurality of wires is connected to the quick connect box;
      wherein the second end of each wire within the plurality of wires is connected to a fan array;
   c. a main power line;
      wherein the main power line is connected to the quick connect box.

2. The quick connect box as described in claim 1 further comprising a plurality of pressure ports.

3. The quick connect box as described in claim 2 further comprising a pressure transmitter.

4. The wiring system as described in claim 3 further comprising a plurality of air hoses;
   wherein each air hose within the plurality of air hoses has a first end and a second end;
   wherein the first end of each air hose within the plurality of air hoses is connected to the quick connect box;
   wherein the second end of each air hose within the plurality of air hoses is connected to a fan within the fan array.

5. The wiring system as described in claim 1 wherein the plurality of wires is mounted to the bulkhead of the air handling unit.

6. The wiring system as described in claim 1 further comprising a main control line.

7. The wiring system as described in claim 6 wherein the main control line is connected to the quick connect box.

8. The wiring system as described in claim 6 wherein the plurality of wires is further comprised of a plurality of power wires and a plurality of control wires.

9. The wiring system as described in claim 8 wherein the plurality of control wires is bussed into the main control line.

10. The wiring system as described in claim 8 wherein the plurality of power wires is bussed into the main power line.

11. The wiring system as described in claim 1 further comprising a disconnect switch.

12. The wiring system as described in claim 1 further comprising a transformer.

13. The wiring system as described in claim 1 further comprising a contactor.

14. The wiring system as described in claim 1 further comprising a plurality of control relays.

15. The wiring system as described in claim 1 further comprising a control panel;
   wherein the control panel is connected to the second end of the main power line;
   wherein the control panel is connected to the second end of the main control line.

16. An HVAC fan array wiring system which is comprised of:
   a. a quick connect box;
      wherein the quick connect box is comprised of:
         i. a plurality of terminal blocks;
         ii. a plurality of plug connectors;
         iii. a power distribution block;
         iv. branch circuit protection;
      wherein the quick connect box is mounted to a wall of an air handling unit;
   b. a plurality of wires;
      wherein each wire within the plurality of wires has a first end and a second end;
      wherein the first end of each wire within the plurality of wires is connected to the quick connect box;
      wherein the second end of each wire within the plurality of wires is connected to a fan array;
   c. a main power line;
      wherein the main power line is connected to the quick connect box.

17. The quick connect box as described in claim 16 further comprising a plurality of pressure ports.

18. The quick connect box as described in claim 17 further comprising a pressure transmitter.

19. The wiring system as described in claim 18 further comprising a plurality of air hoses;
   wherein each air hose within the plurality of air hoses has a first end and a second end;
   wherein the first end of each air hose within the plurality of air hoses is connected to the quick connect box;
   wherein the second end of each air hose within the plurality of air hoses is connected to a fan within the fan array.

20. The wiring system as described in claim 16 wherein the plurality of wires is mounted to the bulkhead of the air handling unit.

21. The wiring system as described in claim 16 further comprising a main control line.

22. The wiring system as described in claim 21 wherein the main control line is connected to the quick connect box.

23. The wiring system as described in claim 21 wherein the plurality of wires is further comprised of a plurality of power wires and a plurality of control wires.

24. The wiring system as described in claim 23 wherein the plurality of control wires is bussed into the main control line.

25. The wiring system as described in claim 23 wherein the plurality of power wires is bussed into the main power line.

26. The wiring system as described in claim 16 further comprising a disconnect switch.

27. The wiring system as described in claim 16 further comprising a transformer.

28. The wiring system as described in claim 16 further comprising a contactor.

29. The wiring system as described in claim further comprising a plurality of control relays.

30. The wiring system as described in claim 16 further comprising a control panel;
   wherein the control panel is connected to the main power line;
   wherein the control panel is connected to the main control line.

31. An HVAC fan array wiring system which is comprised of:
   a. a quick connect box;
      wherein the quick connect box is comprised of:
         i. a plurality of terminal blocks;
         ii. a plurality of plug connectors;
         iii. a power distribution block;
         iv. branch circuit protection;
      wherein the quick connect box is mounted proximate to an air handling unit;
   b. a plurality of wires;
      wherein each wire within the plurality of wires has a first end and a second end;
      wherein the first end of each wire within the plurality of wires is connected to the quick connect box;
      wherein the second end of each wire within the plurality of wires is connected to a fan array;
   c. a main power line;
      wherein the main power line is connected to the quick connect box.

32. The quick connect box as described in claim 31 further comprising a plurality of pressure ports.

33. The quick connect box as described in claim 32 further comprising a pressure transmitter.

34. The wiring system as described in claim 33 further comprising a plurality of air hoses;
   wherein each air hose within the plurality of air hoses has a first end and a second end;
   wherein the first end of each air hose within the plurality of air hoses is connected to the quick connect box;
   wherein the second end of each air hose within the plurality of air hoses is connected to a fan within the fan array.

35. The wiring system as described in claim 31 wherein the plurality of wires is mounted to the bulkhead of the air handling unit.

36. The wiring system as described in claim 31 further comprising a main control line.

37. The wiring system as described in claim 36 wherein the main control line is connected to the quick connect box.

38. The wiring system as described in claim 36 wherein the plurality of wires is further comprised of a plurality of power wires and a plurality of control wires.

39. The wiring system as described in claim 38 wherein the plurality of control wires is bussed into the main control line.

40. The wiring system as described in claim 38 wherein the plurality of power wires is bussed into the main power line.

41. The wiring system as described in claim 31 further comprising a disconnect switch.

42. The wiring system as described in claim 31 further comprising a transformer.

43. The wiring system as described in claim 31 further comprising a contactor.

44. The wiring system as described in claim 31 further comprising a plurality of control relays.

45. The wiring system as described in claim 31 further comprising a control panel;
   wherein the control panel is connected to the second end of the main power line;
   wherein the control panel is connected to the second end of the main control line.

\* \* \* \* \*

UNITED STATES PATENT AND TRADEMARK OFFICE
CERTIFICATE OF CORRECTION

| | | |
|---|---|---|
| PATENT NO. | : 11,852,151 B2 | Page 1 of 1 |
| APPLICATION NO. | : 17/856939 | |
| DATED | : December 26, 2023 | |
| INVENTOR(S) | : Robert Clarke Story, Matthew Wayne Kent and David Kurt Thomas | |

It is certified that error appears in the above-identified patent and that said Letters Patent is hereby corrected as shown below:

In the Claims

Column 7, Line 1, the claim should read The wiring system as described in claim 16.

Signed and Sealed this
Fourth Day of March, 2025

Coke Morgan Stewart
*Acting Director of the United States Patent and Trademark Office*